United States Patent
Li (10) Patent No.: US 12,331,804 B2
(45) Date of Patent: Jun. 17, 2025

(54) SHOCK-ABSORBING BRACKET, GIMBAL CAMERA ASSEMBLY, AND UNMANNED AERIAL VEHICLE ASSEMBLY

(71) Applicant: AUTEL ROBOTICS CO., LTD., Guangdong (CN)

(72) Inventor: Yangfan Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 183 days.

(21) Appl. No.: 18/064,094

(22) Filed: Dec. 9, 2022

(65) Prior Publication Data

US 2023/0104235 A1    Apr. 6, 2023

Related U.S. Application Data

(63) Continuation of application No. PCT/CN2021/097753, filed on Jun. 1, 2021.

(30) Foreign Application Priority Data

Jun. 12, 2020    (CN) .......................... 202021095495.8

(51) Int. Cl.
| | |
|---|---|
| F16F 15/04 | (2006.01) |
| B64U 20/87 | (2023.01) |
| F16M 11/12 | (2006.01) |
| F16M 13/02 | (2006.01) |
| G03B 15/00 | (2021.01) |
| G03B 17/56 | (2021.01) |

(52) U.S. Cl.
CPC .............. *F16F 15/04* (2013.01); *B64U 20/87* (2023.01); *F16M 11/12* (2013.01); *F16M 13/02* (2013.01); *G03B 15/006* (2013.01); *G03B 17/561* (2013.01)

(58) Field of Classification Search
CPC .................................. B64D 47/08; F16F 15/08
See application file for complete search history.

(56) References Cited

U.S. PATENT DOCUMENTS

| | | | |
|---|---|---|---|
| 9,169,893 B2* | 10/2015 | Williamson | E02D 3/046 |
| 10,962,082 B2* | 3/2021 | Hyakusoku | F16F 15/04 |

FOREIGN PATENT DOCUMENTS

| | | | |
|---|---|---|---|
| CN | 205480075 U | 8/2016 | |
| CN | 206050094 U | 3/2017 | |
| CN | 210218544 U | 3/2020 | |
| CN | 213083522 U | 4/2021 | |
| JP | S55-144238 U | * 10/1980 | ............. F16F 15/04 |
| JP | 2009248853 A | 10/2009 | |

OTHER PUBLICATIONS

English machine translation of CN 206050094U (Year: 2024).*
PCT International Search Report mailed Jul. 27, 2021; PCT/CN2021/097753.

* cited by examiner

*Primary Examiner* — Leon W Rhodes, Jr.

(57) ABSTRACT

Embodiments of the present invention is a shock-absorbing bracket, including: a mounting bracket; a base, where the base is spaced apart from the mounting bracket; and a plurality of shock-absorbing elements, where one end of each of the plurality of shock-absorbing elements is connected with the mounting bracket. Through the structure, the mounting bracket and the base form a triangular shock-absorbing mounting structure in a vertical direction, the stability of the shock-absorbing bracket is improved, and the shock-absorbing effect is good.

20 Claims, 4 Drawing Sheets

SHOCK-ABSORBING BRACKET, GIMBAL CAMERA ASSEMBLY, AND UNMANNED AERIAL VEHICLE ASSEMBLY

CROSS-REFERENCE TO RELATED APPLICATIONS

The present application is a continuation of International Application No. PCT/CN2021/097753, filed on Jun. 1, 2021, which claims priority to Chinese Patent Application No. 2020210954958, filed on Jun. 12, 2020, which is incorporated herein by reference in its entirety.

TECHNICAL FIELD

The present utility model relates to the field of unmanned aerial vehicles (UAV) technologies, and in particular, to a shock-absorbing bracket, a gimbal camera assembly, and an unmanned aerial vehicle assembly.

BACKGROUND

An unmanned aerial vehicle, referred to as a UAV, is new concept equipment in rapid development, which has the advantages of flexible maneuverability, fast response, unmanned driving, and low operation requirements.

A gimbal is a supporting device for mounting and fixing a gimbal camera. After being fixed, the gimbal and the gimbal camera may be carried by an aircraft to a high altitude for radial aerial photography. In a process of aerial photography, affected by the wind and the vibration of the aircraft, these vibrations are transmitted to the gimbal camera, resulting in blurred or even distorted images, affecting the shooting effect.

Therefore, many gimbals on the market are equipped with shock-absorbing brackets to reduce the vibration of the gimbal through the shock-absorbing brackets, thereby keeping the stability of the gimbal camera. However, the existing shock-absorbing bracket is relatively complex, and the volume and weight of the shock-absorbing bracket are relatively large. Therefore, it is necessary to provide an improved shock-absorbing bracket to reduce vibration and improve shooting quality.

SUMMARY

To resolve the foregoing technical problems, embodiments of the present utility model provide a shock-absorbing bracket, so as to improve the stability of the shock-absorbing bracket and reduce the vibration of the shock-absorbing bracket.

To resolve the foregoing technical problems, the embodiments of the present utility model provide the following technical solutions: a shock-absorbing bracket is provided, including:
  a mounting bracket;
  a base, where the base is spaced apart from the mounting bracket; and
  a plurality of shock-absorbing elements, where one end of each of the plurality of shock-absorbing elements is connected with the mounting bracket, and the other end of each of the plurality of shock-absorbing elements is connected with the base, and
  at least three of the plurality of shock-absorbing elements are first shock-absorbing elements, and at least one of the remaining plurality of shock-absorbing elements is a second shock-absorbing element, the at least three first shock-absorbing elements are located on a horizontal plane, the at least one second shock-absorbing element is located on a side of the horizontal plane, an orthographic projection of the at least one second shock-absorbing element on a vertical plane is located at a first corner of a triangle, an orthographic projection of at least one of the at least three first shock-absorbing elements on the vertical plane is located at a second corner of the triangle, and an orthographic projection of at least one of the remaining first shock-absorbing elements on the vertical plane is located at a third corner of the triangle.

In some embodiments, a quantity of first shock-absorbing elements is four;
  the four first shock-absorbing elements are distributed at four corners of a rectangle.

In some embodiments, the rectangle is a rectangle, a length direction of the rectangle is parallel to the vertical plane, and a width direction of the rectangle is perpendicular to the vertical plane; and
  the rectangle is symmetrical about the vertical plane.

In some embodiments, the shock-absorbing element has a central axis, and the shock-absorbing element includes a first mounting end portion, a connection portion, and a second mounting end portion;
  the connection portion is connected with the first mounting end portion and the second mounting end portion, and the first mounting end portion, the connection portion, and the second mounting end portion are sequentially arranged on the central axis of each of the plurality of shock-absorbing elements; and
  the first mounting end portion is mounted on the mounting bracket, and the second mounting end portion is mounted on the base.

In some embodiments, a central axis of the first shock-absorbing element is perpendicular to the horizontal plane; and
  a central axis of each of the second shock-absorbing elements is perpendicular to the vertical plane.

In some embodiments, the mounting bracket includes a bracket body portion and a plurality of bracket support arms extending from the bracket body portion, and the base includes a base body portion and a plurality of base support arms extending from the base body portion; and
  one end of each of the plurality of shock-absorbing elements is mounted on each of the plurality of bracket support arms, and the other end of each of the plurality of shock-absorbing elements is mounted on each of the plurality of base support arms.

In some embodiments, at least three of the plurality of bracket support arms are bracket horizontal arms, and at least one of the remaining plurality of bracket support arms is a bracket vertical arm;
  at least three of the plurality of base support arms are base horizontal arms, and at least one of the remaining plurality of base support arms is a base vertical arm;
  one end of each of the first shock-absorbing elements is mounted on each of the bracket horizontal arms, and the other end of each of the first shock-absorbing elements is mounted on each of the base horizontal arms; and
  one end of each of the second shock-absorbing elements is mounted on each of the bracket vertical arms, and the other end of each of the second shock-absorbing elements is mounted on the base vertical arm.

In some embodiments, a first mounting hole is provided on each of the bracket support arms, the first mounting hole is sleeved at a joint between the first mounting end portion and the connection portion, a cross-sectional size of the first mounting hole is greater than a cross-sectional size of the joint between the first mounting end portion and the connection portion, and both a cross-sectional size of the first mounting end portion and a cross-sectional size of the connection portion are greater than the cross-sectional size of the first mounting hole and both are greater than the cross-sectional size of the joint between the first mounting end portion and the connection portion; and/or a second mounting hole is provided on each of the base support arms, the second mounting hole is sleeved at a joint between the second mounting end portion and the connection portion, a cross-sectional size of the second mounting hole is greater than a cross-sectional size of the joint between the second mounting end portion and the connection portion, and both a cross-sectional size of the second mounting end portion and a cross-sectional size of the connection portion are greater than the cross-sectional size of the second mounting hole and both are greater than the cross-sectional size of the joint between the second mounting end portion and the connection portion.

The present utility model further provides a gimbal camera assembly, including a shock-absorbing bracket; and a gimbal camera, where the gimbal camera is mounted on a base of the shock-absorbing bracket.

The present utility model further provides an unmanned aerial vehicle assembly, including:

an unmanned aerial vehicle;

a load; and the shock-absorbing bracket, where a mounting bracket of the shock-absorbing bracket is mounted on the unmanned aerial vehicle, and a base of the shock-absorbing bracket carries the load.

Compared with the related art, the shock-absorbing bracket provided in this embodiment of the present utility model forms a triangular shock-absorbing mounting structure between the mounting bracket and the base in a vertical direction, which improves the structural stability of the shock-absorbing bracket, and also ensures a good shock-absorbing effect.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present utility model, the present utility model is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being electrically connected to" another component, the component may be directly connected to the another component, or one or more intermediate components may exist between the component and the another component. In the description of this specification, orientation or position relationships indicated by the terms such as "up", "down", "horizontal", and "vertical" are based on orientation or position relationships shown in the accompanying drawings, and are used only for ease and brevity of illustration and description of the present utility model, rather than indicating or implying that the mentioned apparatus or component needs to have a particular orientation or needs to be constructed and operated in a particular orientation. Therefore, such terms should not be construed as limiting of the present utility model. In addition, terms "first" and "second" are only used to describe the objective and cannot be understood as indicating or implying relative importance.

Unless otherwise defined, meanings of all technical and scientific terms used in the present utility model are the same as those usually understood by a person skilled in the art to which the present utility model belongs. Terms used in the specification of the present utility model are merely intended to describe objectives of the specific embodiment, and are not intended to limit the present utility model. A term "and/or" used in this specification includes any or all combinations of one or more related listed items.

In addition, technical features involved in different embodiments of the present utility model described below may be combined together if there is no conflict.

Figure 1:
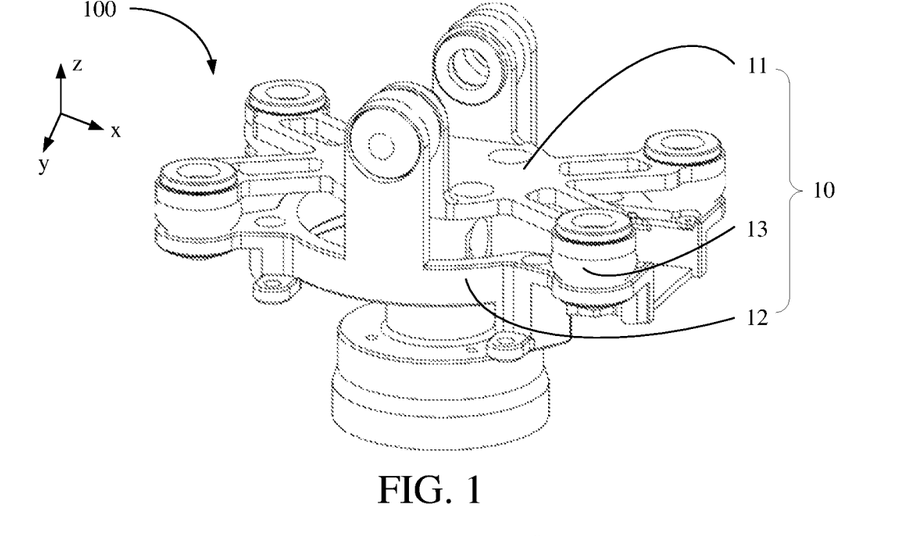
FIG. 1 is a schematic structural diagram of a gimbal camera assembly according to an embodiment of the present utility model.

Referring to FIG. 1, a gimbal camera assembly 100 provided in an embodiment of the present utility model is configured to be mounted on an unmanned aerial vehicle for aerial photography, including a shock-absorbing bracket 10 and a gimbal camera. The gimbal camera is mounted on the shock-absorbing bracket 10.

Figure 2:
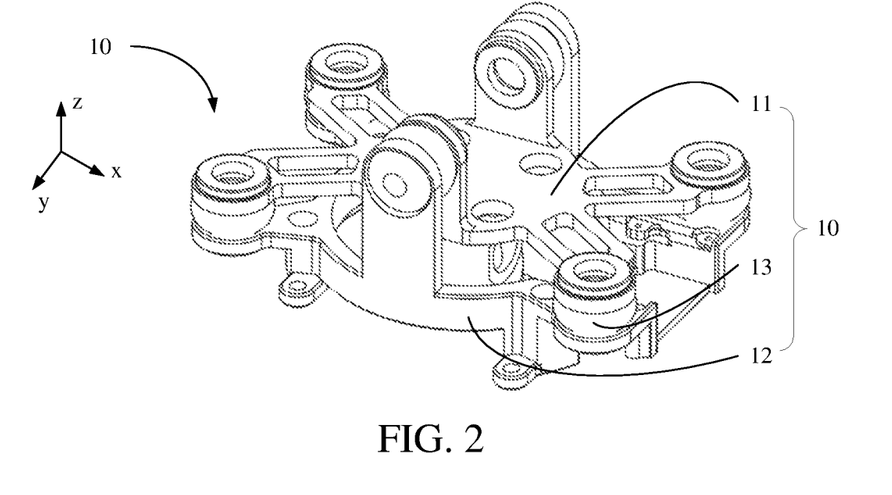
FIG. 2 is a schematic structural diagram of a shock-absorbing bracket according to another embodiment of the present utility model.
Figure 3:
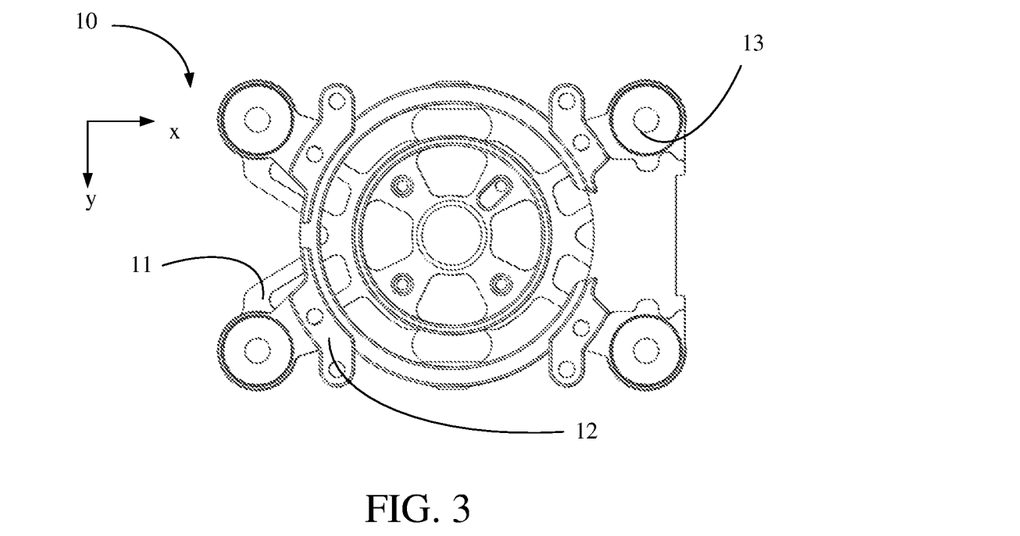
FIG. 3 is a bottom view of the shock-absorbing bracket shown in FIG. 2.

Referring to FIG. 2 and FIG. 3, a shock-absorbing bracket 10 provided in another embodiment of the present utility model is configured to be mounted on the unmanned aerial vehicle to carry a load, and the load may be the gimbal camera.

In this application, a description is made by using an example in which the shock-absorbing bracket 10 is mounted on the unmanned aerial vehicle and the unmanned aerial vehicle is in a stable flight state. When the unmanned aerial vehicle is in a stable flight state, a forward direction of the unmanned aerial vehicle is set to be an x direction, a direction of left or right movement of the unmanned aerial vehicle is set to be a y direction, and an ascending or descending direction of the unmanned aerial vehicle is set to be a z direction.

The shock-absorbing bracket 10 is in a rectangular architecture as a whole, is orthographically projected on a horizontal plane in a rectangular region, and is in contact with a boundary of the rectangular region. The horizontal plane is perpendicular to the z direction, a length direction of the rectangular region is parallel to the x direction, and a width direction is parallel to the y direction. The shock-absorbing bracket 10 is suitable for being mounted on an unmanned aerial vehicle that has strict requirements on space, such as a slender unmanned aerial vehicle, and may produce a better shock-absorbing effect in a narrow space.

The shock-absorbing bracket 10 includes a mounting bracket 11, a base 12, and a shock-absorbing element 13. The mounting bracket 11 is spaced apart from the base 12. One end of the shock-absorbing element 13 is connected with the mounting bracket 11, and the other end of the shock-absorbing element 13 is connected with the base 12.

Figure 4:
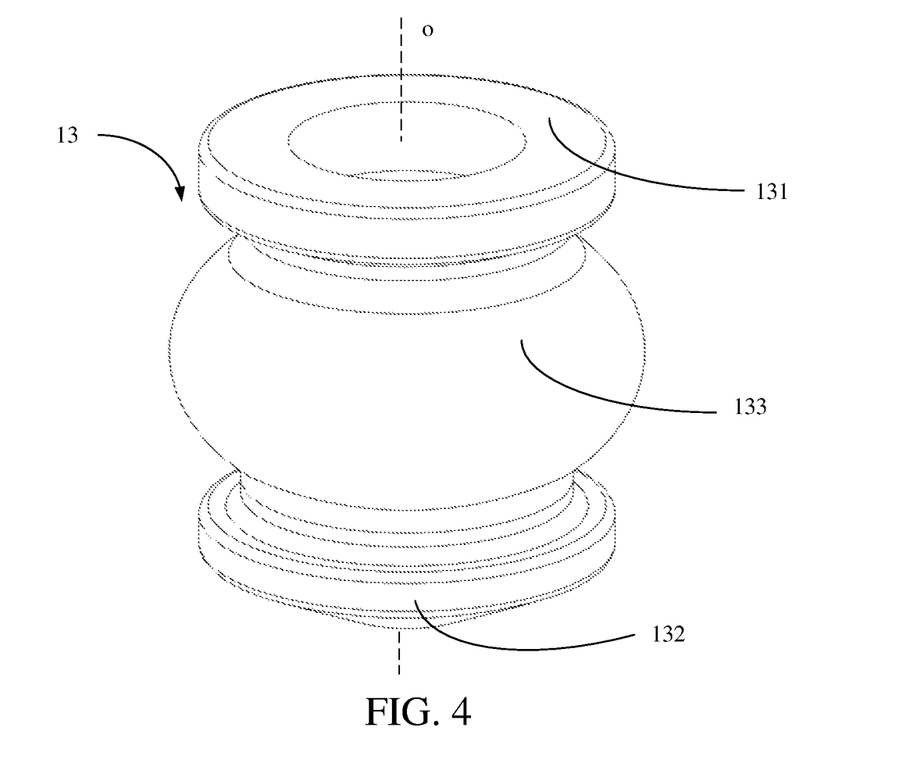
FIG. 4 is a schematic structural diagram of shock-absorbing elements in the shock-absorbing bracket shown in FIG. 2.

Referring to FIG. 4, the shock-absorbing element 13 has a central axis O. The shock-absorbing element 13 includes a first mounting end portion 131, a second mounting end portion 132, and a connection portion 133. The connection portion 133 is connected with the first mounting end portion 131 and the second mounting end portion 132, and the first mounting end portion 131, the connection portion 133, and the second mounting end portion 132 are all arranged on the central axis O. The first mounting end portion 131 is configured to be mounted on the mounting bracket 11, and the second mounting end portion 132 is configured to be mounted on the base 12. The connection portion 133 may elastically extend and contract along the central axis O, so as to reduce the vibration transmitted from the mounting bracket 11 to the base 12 along the central axis O.

The connection portion 133 is substantially in a spherical shape and has a spherical center, and the spherical center is located on the central axis O.

Both the first mounting end portion 131 and the second mounting end portion 132 are in relatively flat cylindrical shapes, and both have center lines. The center lines of the first mounting end portion 131 and the second mounting end portion 132 coincide with the central axis O.

Both a radius of the first mounting end portion 131 and a radius of the connection portion 133 are greater than a radius of a joint between the first mounting end portion and the connection portion. An annular first slot body is formed at the joint between the first mounting end portion 131 and the connection portion 133, and the first slot body is configured to be engaged with the mounting bracket 11. Both a radius of the second mounting end portion 132 and a radius of the connection portion 133 are greater than a radius of a joint between the second mounting end portion and the connection portion. An annular second slot body is formed at the joint between the second mounting end portion 132 and the connection portion 133, and the second slot body is configured to be engaged with the base 12.

In this embodiment, the first mounting end portion 131, the second mounting end portion 132, and the connection portion 133 are an integrally formed structure. In some other embodiments, the first mounting end portion 131 and the second mounting end portion 132 may also be separately formed, and are fixedly connected with the connection portion 133 in a manner of gluing, or the like.

The connection portion 133 is a hollow cavity. Having a hollow cavity may not only reduce the rigidity to increase the elasticity, but also reduce the weight of the shock-absorbing element 13.

The hollow cavity extends from the connection portion 133 to the first mounting end portion 131, and runs through the first mounting end portion 131, so that air in the hollow cavity may be discharged in a process in which the shock-absorbing element 13 is squeezed between the first mounting end portion and the second mounting end portion. According to actual needs, the hollow cavity may further extend toward and run through the second mounting end portion 132.

Figure 5:
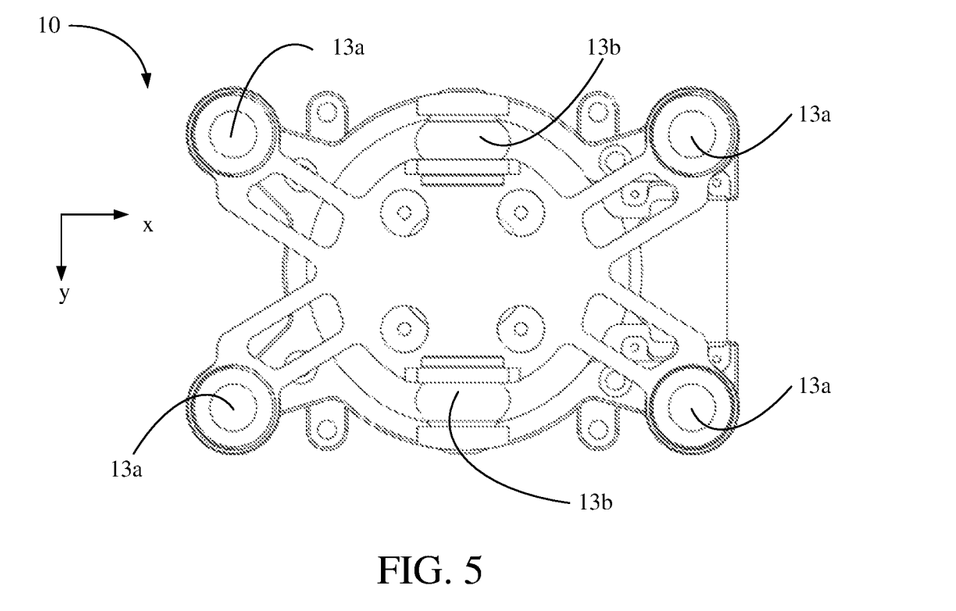
FIG. 5 is a top view of the shock-absorbing bracket shown in FIG. 2.

Referring to FIG. 5, a quantity of shock-absorbing elements 13 is six. Four of the six shock-absorbing elements are first shock-absorbing elements 13a, and the remaining two of the six shock-absorbing elements are second shock-absorbing elements 13b.

Connection portions of the four first shock-absorbing elements 13a are substantially located on the horizontal plane, and are evenly distributed on two sides of a vertical plane. The horizontal plane is perpendicular to the z direction, and the vertical plane is perpendicular to the y direction.

It should be noted that, both the horizontal plane and the vertical plane are virtual planes, which are used for facilitating the description of a position relationship of each shock-absorbing element.

The four first shock-absorbing elements 13a are respectively located at four corners of a rectangle, and the rectangle is located in the horizontal plane.

The rectangle may be a rectangle, where a length direction of the rectangle is parallel to the x direction (a length direction of the rectangle is parallel to the vertical plane), and a width direction of the rectangle is parallel to the y direction (a width direction of the rectangle is perpendicular to the vertical plane). An edge of the rectangle is substantially coincident with the rectangle region, so as to increase a size of the shock-absorbing bracket as much as possible in a narrow space, thereby improving the shock-absorbing effect.

The rectangle is symmetrical about the vertical plane, so as to improve the symmetry of the shock-absorbing bracket, thereby improving the stability of the shock-absorbing bracket.

A central axis of each of the first shock-absorbing elements 13a is parallel to the z direction, and the four first shock-absorbing elements 13a jointly reduce the vibration transmitted from the mounting bracket 11 to the base 12 along the z direction.

Figure 6:
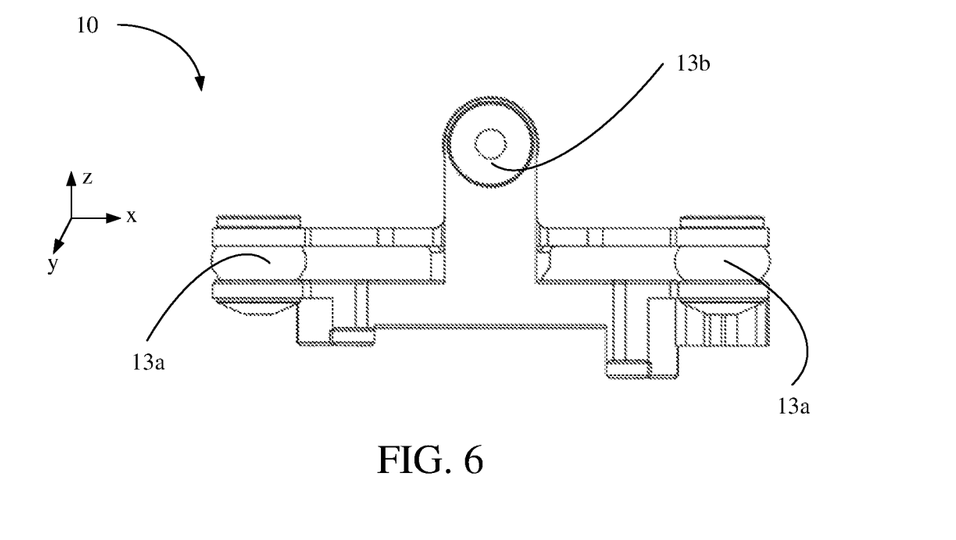
FIG. 6 is a front view of the shock-absorbing bracket shown in FIG. 2.

Referring to FIG. 6, both the two second shock-absorbing elements 13b are located on a side of the horizontal plane, and orthographic projections of the two second shock-absorbing elements 13b on the vertical plane are located at a first corner of a triangle, orthographic projections of two of the four first shock-absorbing elements on the vertical plane are located at a second corner of the triangle, and orthographic projections of remaining two of the four first shock-absorbing elements on the vertical plane are located at a third corner of the triangle. Due to the stability of the triangle, the deformation of the shock-absorbing elements constituting the triangle in the x direction may be reduced, thereby reducing the vibration of the shock-absorbing bracket 10 in the x direction.

It may be understood that, the quantity of first shock-absorbing elements is not limited to four, and the quantity of second shock-absorbing elements is not limited to two. According to actual needs, the quantity of first shock-absorbing elements may further be three, five, six, or more, and the quantity of second shock-absorbing elements may further be one, three, four, or more. The shock-absorbing elements only need to meet the following conditions: the quantity of shock-absorbing elements is more than one, at least three of the plurality of shock-absorbing elements are the first shock-absorbing elements, and at least one of the remaining plurality of shock-absorbing elements is a second shock-absorbing element, the at least three first shock-absorbing elements are located on a horizontal plane, the at least one second shock-absorbing element is located on a side of the horizontal plane, an orthographic projection of the at least one second shock-absorbing element on a vertical plane is located at a first corner of a triangle, an orthographic projection of at least one of the at least three first shock-absorbing elements on the vertical plane is located at a second corner of the triangle, and an orthographic projection of at least one of the remaining first shock-absorbing elements on the vertical plane is located at a third corner of the triangle.

The two second shock-absorbing elements 13b are respectively located on two sides of the vertical plane, so as to improve the symmetry of the shock-absorbing bracket, thereby improving the stability of the shock-absorbing bracket.

It should be noted that, two sides of the horizontal/vertical plane are spaces on two sides that are delimited by the horizontal/vertical plane, and a side of the horizontal/vertical plane is one of the spaces on the two sides that is delimited by the horizontal/vertical plane.

The two second shock-absorbing elements 13b are symmetrical about the vertical plane, so as to further improve the symmetry of the shock-absorbing bracket, thereby improving the stability of the shock-absorbing bracket.

A central axis of each of the second shock-absorbing elements 13b is parallel to the y direction. The two second shock-absorbing elements 13b are jointly configured to reduce the vibration transmitted from the mounting bracket 11 to the base 12 in the y direction. In this way, the vibrations of the shock-absorbing bracket 10 in both the x direction and the y direction are reduced.

To further improve the shock-absorbing effect of the shock-absorbing bracket 10, both the mounting bracket 11 and the base 12 may be made of elastic materials. The elastic material may be plastic, rubber, or metal, provided that the structural strength of the elastic material is sufficient and the elastic material has a specific elasticity.

Figure 7:
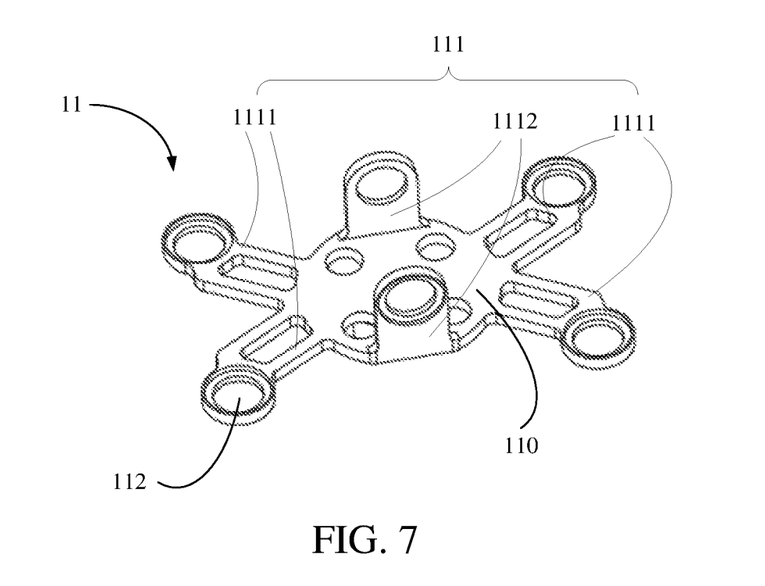
FIG. 7 is a schematic structural diagram of a mounting bracket in the shock-absorbing bracket shown in FIG. 2.

Referring to FIG. 7, the mounting bracket 11 and the two second shock-absorbing elements 13b are all located on the same side of the horizontal plane. The mounting bracket 11 includes a bracket body portion 110 and bracket support arms 111. The bracket support arms 111 extend from the bracket body portion 110.

The bracket body portion 110 is substantially a circular plate body, and is perpendicular to the z direction.

One end of each of the bracket support arms 111 is integrally connected with the bracket body portion 110, and the other end of each of the bracket support arms 111 extends outward to form a first free end portion. A first mounting hole 112 is provided on the first free end portion, and the first mounting hole 112 is a circular hole. The first mounting hole 112 is configured to be sleeved on the first slot body to fix the first mounting end portion 131.

Specifically, a radius of the first mounting hole 112 is greater than a radius of a joint between the first mounting end portion 131 and the connection portion 130, and is less than a radius of the connection portion 130 and a radius of the first mounting end portion 131.

A quantity of bracket support arms 111 corresponds to a quantity of shock-absorbing elements. That is, the quantity of bracket support arms 111 is six.

Four of the six bracket support arms 111 are bracket horizontal arms 1111, and the remaining two of the six bracket support arms 111 are bracket vertical arms 1112.

The four bracket horizontal arms are scattered out by using the bracket body portion as a center, and the four bracket horizontal arms are substantially located in a plane perpendicular to the z direction. One end of each of the four first shock-absorbing elements 13a is mounted on each of the four bracket horizontal arms respectively, and the other end of each of the four first shock-absorbing elements 13a is mounted on the base.

The two bracket vertical arms are spaced apart on two sides of the vertical plane, and both are located on a connection portion between the two second shock-absorbing elements 13b. One end of each of the two second shock-absorbing elements 13b is mounted on each of the two bracket vertical arms respectively, and the other end of each of the two second shock-absorbing elements is mounted on the base.

It may be understood that, according to actual needs, the four bracket horizontal arms may be omitted. For example, the bracket body portion is designed as a rectangular frame structure, and four first mounting holes are respectively provided at four corners of the rectangular frame structure. One end of each of the four first shock-absorbing elements is mounted at the four corners of the rectangular frame structure respectively.

Figure 8:
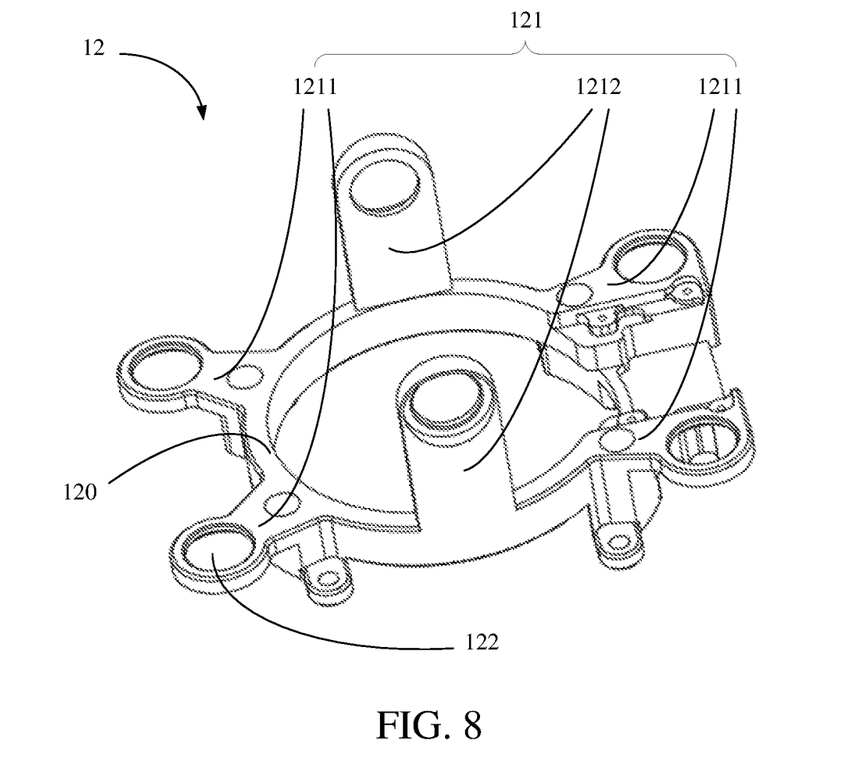
FIG. 8 is a schematic structural diagram of a base in the shock-absorbing bracket shown in FIG. 2.

The base 12 includes a base body portion 120 and base support arms 121. The base support arms 121 extend from the base body portion 120.

The base body portion 120 and the bracket body portion 110 are located on different sides of the horizontal plane. The base body portion is substantially a circular plate body, and is perpendicular to the z direction.

One end of each of the base support arms 121 is integrally connected with the base body portion 120, and the other end of each of the base support arms 121 extends outward to form a second free end portion. A second mounting hole 122 is provided on the second free end portion, and the second mounting hole 122 is a circular hole. The second mounting hole 122 is configured to be sleeved on the second slot body to fix the second mounting end portion 132.

The shock-absorbing elements 13 may be fixedly connected with the mounting bracket 11 and the base 12 respectively without other connecting members. In addition, the shock-absorbing elements 13 have a specific elasticity, so that the mounting hole may be conveniently sleeved in the slot, causing the mounting of the shock-absorbing bracket to be relatively simple.

Specifically, a radius of the second mounting hole is greater than a radius of a joint between the second mounting end portion and the connection portion, and is less than a radius of the connection portion and a radius of the second mounting end portion.

It may be understood that the connection portion is not limited to a spherical shape, the first mounting end portion and the second mounting end portion are not limited to cylindrical shapes, and the first mounting hole and the second mounting hole are not limited to circular holes. According to actual needs, the connection portion, the first mounting end portion, the second mounting end portion, the first mounting hole, and the second mounting hole may be of any shape, provided that the following conditions are met: both a cross-sectional size of the first mounting end portion and a cross-sectional size of the connection portion are greater than a cross-sectional size of a joint between the first mounting end portion and the connection portion, and are greater than a cross-sectional size of the first mounting hole. The cross-sectional size of the first mounting hole is greater than the cross-sectional size of the joint between the first mounting end portion and the connection portion; and both a cross-sectional size of the second mounting end portion and a cross-sectional size of the connection portion are greater than a cross-sectional size of a joint between the second mounting end portion and the connection portion, and are greater than a cross-sectional size of the second mounting hole. The cross-sectional size of the second mounting hole is greater than the cross-sectional size of the joint between the second mounting portion and the connection portion, provided that it may be ensured that the first mounting hole may be engaged at the joint between the first mounting end portion and the connection portion, and the second mounting hole may be engaged at the joint between the second mounting end portion and the connection portion.

A quantity of base support arms 121 corresponds to a quantity of shock-absorbing elements. That is, the quantity of base support arms 121 is six.

Four of the six base support arms 121 are base horizontal arms 1211, and the remaining two of the six base support arms 121 are base vertical arms 1212.

The four base horizontal arms are scattered out by using the base body as a center, and the four base horizontal arms are substantially located in a plane perpendicular to the z direction. One end of each of the four first shock-absorbing elements 13a is mounted on the mounting bracket, and the other end of each of the four first shock-absorbing elements 13a is mounted on each of the four base horizontal arms respectively.

The two base vertical arms are respectively located on two sides of the vertical plane, and span the bracket body portion by extending from two sides of the bracket body portion to the two second shock-absorbing elements. Both connection portions of the two second shock-absorbing elements 13b are located between the two base vertical arms. One end of each of the two second shock-absorbing elements 13b is mounted on the mounting bracket, and the other end of each of the two shock-absorbing elements 13b is mounted on each of the two base vertical arms respectively.

It may be understood that, according to actual needs, the four base horizontal arms may be omitted. For example, the base body portion is designed as a rectangular frame structure, and four second mounting holes are respectively provided at four corners of the rectangular frame structure. The other end of each of the four first shock-absorbing elements is mounted at the four corners of the rectangular frame structure respectively.

It may be understood that, the quantity of bracket support arms is not limited to six, and the quantity of base support arms is not limited to six. Among the bracket support arms, the quantity of bracket horizontal arms needs to correspond to the quantity of first shock-absorbing elements, and the quantity of bracket vertical arms needs to correspond to the quantity of second shock-absorbing elements; and among the base support arms, the quantity of base horizontal arms corresponds to the quantity of first shock-absorbing elements, and the quantity of base vertical arms corresponds to the quantity of second shock-absorbing elements. According to actual needs, the bracket support arms and the base support arms only need to meet the following conditions: the quantity of bracket support arms is more than one, at least three of the plurality of bracket support arms are bracket horizontal arms, and at least one of the remaining plurality of bracket support arms is a bracket vertical arm; and the quantity of base support arms is more than one, at least three of the plurality of base support arms are base horizontal arms, and at least one of the remaining plurality of base support arms is a base vertical arm.

In some embodiments, shock-absorbing holes or lightening grooves are further provided on the mounting bracket 11 and the base 12 to reduce a weight of the mounting bracket 11 and a weight of the base 12. Quantities or sizes of shock-absorbing holes and shock-absorbing grooves are as great as possible in a case that the support strength is met.

Compared with the related art, the shock-absorbing bracket provided in this embodiment of the present utility model forms a triangular shock-absorbing mounting structure between the mounting bracket and the base in a vertical direction through the arrangement of positions of the shock-absorbing elements, which improves the structural stability of the shock-absorbing bracket, and also ensures a good shock-absorbing effect.

Yet another embodiment of the present utility model provides an unmanned aerial vehicle assembly, which includes the shock-absorbing bracket, an unmanned aerial vehicle, and a load. A mounting bracket of the shock-absorbing bracket is mounted on the unmanned aerial vehicle, and a base of the shock-absorbing bracket carries the load. Through a structure of the shock-absorbing bracket, the load of the unmanned aerial vehicle may be kept in a stable state during the flight.

Compared with the related art, the present utility model provides a shock-absorbing bracket, a gimbal camera assembly, and an unmanned aerial vehicle assembly. A second shock-absorbing element is arranged between a bracket vertical arm and a base vertical arm, and a first shock-absorbing element is arranged between the bracket horizontal arm and a base horizontal arm, so that two first shock-absorbing elements located on a side of the body portion and one second shock-absorbing element are in a triangular architecture, causing the deformation of the shock-absorbing elements in a front direction or a rear direction to be small, and the stability of the triangular architecture is high, which improves the stability of the structure of the shock-absorbing bracket.

The other two second shock-absorbing elements are arranged to cause the deformation of the second shock-absorbing element to be small in a left direction or a right direction; and as a result, the vibrations of the shock-absorbing bracket in the front, rear, left, and right directions is reduced, so that the gimbal camera mounted on the shock-absorbing bracket is kept stable, thereby ensuring that an image captured by the gimbal camera is clear and stable. In addition, the load mounted on the shock-absorbing bracket may also be kept stable.

Finally, it should be noted that the foregoing embodiments are merely used for describing the technical solutions of the present utility model, but are not intended to limit the present utility model. Under the concept of the present utility model, the technical features in the foregoing embodiments or different embodiments may be combined, the steps may be implemented in any sequence, and there may be many other changes in different aspects of the present utility model as described above. For brevity, those are not provided in detail. Although the present utility model is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present utility model.

What is claimed is:

1. A shock-absorbing bracket, comprising:
   a mounting bracket;
   a base, wherein the base is spaced apart from the mounting bracket; and
   a plurality of shock-absorbing elements, wherein one end of each of the plurality of shock-absorbing elements is connected with the mounting bracket, and the other end of each of the plurality of shock-absorbing elements is connected with the base; and
   wherein
      at least three of the plurality of shock-absorbing elements are first shock-absorbing elements,
      at least one of the plurality of shock-absorbing elements is a second shock-absorbing element,
      the at least three first shock-absorbing elements are located at three corners of a triangle, the triangle defining a horizontal plane, and
      the at least one second shock-absorbing element is located
         above the horizontal plane and
         in a location that, when the location is orthographically projected onto the horizontal plane, is on a side of the triangle and midway between two of the corners of the triangle.

2. The shock-absorbing bracket according to claim 1, wherein
   the plurality of at least three first shock-absorbing elements includes four first shock-absorbing elements; and
   the four first shock-absorbing elements are distributed at four corners of a rectangle.

3. The shock-absorbing bracket according to claim 2, wherein
   a length direction of the rectangle is parallel to a vertical plane, and a width direction of the rectangle is perpendicular to the vertical plane; and
   the rectangle is symmetrical about the vertical plane.

4. The shock-absorbing bracket according to claim 1, wherein
   the at least one second shock-absorbing elements includes two second shock-absorbing elements,
   the first of the two at least three first shock-absorbing elements and the second of the at least three first shock-absorbing elements are located on different sides of the vertical plane, and
   the two second shock-absorbing elements are symmetrical about the vertical plane.

5. The shock-absorbing bracket according to claim 1, wherein each of the plurality of shock-absorbing elements has a central axis, and each of the plurality of shock-absorbing elements comprises a first mounting end portion, a connection portion, and a second mounting end portion;
   the connection portion is connected with the first mounting end portion and the second mounting end portion, and the first mounting end portion, the connection portion, and the second mounting end portion are sequentially arranged on the central axis of each of the plurality of shock-absorbing elements; and
   the first mounting end portion is mounted on the mounting bracket, and the second mounting end portion is mounted on the base.

6. The shock-absorbing bracket according to claim 5, wherein a central axis of each of the first shock-absorbing elements is perpendicular to the horizontal plane; and
   a central axis of each of the second shock-absorbing elements is perpendicular to the vertical plane.

7. The shock-absorbing bracket according to claim 6, wherein
   the mounting bracket comprises a bracket body portion and a plurality of bracket support arms extending from the bracket body portion, and the base comprises a base body portion and a plurality of base support arms extending from the base body portion; and
   one end of each of the plurality of shock-absorbing elements is mounted on each of the plurality of bracket support arms, and the other end of each of the plurality of shock-absorbing elements is mounted on each of the plurality of base support arms.

8. The shock-absorbing bracket according to claim 7, wherein
   the at least three plurality of bracket support arms are bracket horizontal arms, and at least one of the remaining plurality of bracket support arms is a bracket vertical arm;
   the at least three plurality of base support arms are base horizontal arms, and at least one of the remaining plurality of base support arms is a base vertical arm;
   one end of each of the first shock-absorbing elements is mounted on each of the bracket horizontal arms, and the other end of each of the first shock-absorbing elements is mounted on each of the base horizontal arms; and
   one end of each of the second shock-absorbing elements is mounted on each of the bracket vertical arms, and the other end of each of the second shock-absorbing elements is mounted on the base vertical arm.

9. The shock-absorbing bracket according to claim 7, wherein
   a first mounting hole is provided on each of the bracket support arms, the first mounting hole is sleeved at a joint between the first mounting end portion and the connection portion, a cross-sectional size of the first mounting hole is greater than a cross-sectional size of the joint between the first mounting end portion and the connection portion, and both a cross-sectional size of the first mounting end portion and a cross-sectional size of the connection portion are greater than the cross-sectional size of the first mounting hole and both are greater than the cross-sectional size of the joint between the first mounting end portion and the connection portion; and/or
   a second mounting hole is provided on each of the base support arms, the second mounting hole is sleeved at a joint between the second mounting end portion and the connection portion, a cross-sectional size of the second mounting hole is greater than a cross-sectional size of the joint between the second mounting end portion and the connection portion, and both a cross-sectional size of the second mounting end portion and a cross-sectional size of the connection portion are greater than the cross-sectional size of the second mounting hole and both are greater than the cross-sectional size of the joint between the second mounting end portion and the connection portion.

10. A gimbal camera assembly, comprising:
a shock-absorbing bracket; and
a gimbal camera, wherein the gimbal camera is mounted on a base of the shock-absorbing bracket; and
the shock-absorbing bracket comprises:
   a mounting bracket;
   a base, wherein the base is spaced apart from the mounting bracket; and
   a plurality of shock-absorbing elements, wherein one end of each of the plurality of shock-absorbing elements is connected with the mounting bracket, and the other end of each of the plurality of shock-absorbing elements is connected with the base, and wherein
      at least three of the plurality of shock-absorbing elements are first shock-absorbing elements,
      at least one of the plurality of shock-absorbing elements is a second shock-absorbing element,
      the at least three first shock-absorbing elements are located at three corners of a triangle, the triangle defining a horizontal plane, and
      the at least one second shock-absorbing element is located
         above the horizontal plane and
         in a location that, when the location is orthographically projected onto the horizontal plane, is on a side of the triangle and midway between two of the corners of the triangle.

11. The gimbal camera assembly according to claim 10, wherein
   the plurality of at least three first shock-absorbing elements includes four first shock-absorbing elements; and
   the four first shock-absorbing elements are distributed at four corners of a rectangle;
   wherein
      a length direction of the rectangle is parallel to a vertical plane, and a width direction of the rectangle is perpendicular to the vertical plane; and
      the rectangle is symmetrical about the vertical plane.

12. The gimbal camera assembly according to claim 10, wherein
   the at least one second shock-absorbing elements includes two second shock-absorbing elements; and
   the first of the two at least three first shock-absorbing elements and the second of the at least three first shock-absorbing elements are located on different sides of the vertical plane, and
   the two second shock-absorbing elements are symmetrical about the vertical plane.

13. The gimbal camera assembly according to claim 10, wherein each of the plurality of shock-absorbing elements has a central axis, and a central axis of each of the first shock-absorbing elements is perpendicular to the horizontal plane; and a central axis of each of the second shock-absorbing elements is perpendicular to the vertical plane;
   each of the plurality of shock-absorbing element comprises a first mounting end portion, a connection portion, and a second mounting end portion; the connection portion is connected with the first mounting end portion and the second mounting end portion, and the first mounting end portion, the connection portion, and the second mounting end portion are sequentially arranged on the central axis of each of the plurality of shock-absorbing elements; and the first mounting end portion is mounted on the mounting bracket, and the second mounting end portion is mounted on the base.

14. The gimbal camera assembly according to claim 13, wherein
   the mounting bracket comprises a bracket body portion and a plurality of bracket support arms extending from the bracket body portion, and the base comprises a base body portion and a plurality of base support arms extending from the base body portion; and
   one end of each of the plurality of shock-absorbing elements is mounted on each of the plurality of bracket support arms, and the other end of each of the plurality of shock-absorbing elements is mounted on each of the plurality of base support arms.

15. The gimbal camera assembly according to claim 14, wherein
   the at least three plurality of bracket support arms are bracket horizontal arms, and at least one of the remaining plurality of bracket support arms is a bracket vertical arm;
   the at least three plurality of base support arms are base horizontal arms, and at least one of the remaining plurality of base support arms is a base vertical arm;
   one end of each of the first shock-absorbing elements is mounted on each of the bracket horizontal arms, and the other end of each of the first shock-absorbing elements is mounted on each of the base horizontal arms; and
   one end of each of the second shock-absorbing elements is mounted on each of the bracket vertical arms, and the other end of each of the second shock-absorbing elements is mounted on the base vertical arm.

16. The gimbal camera assembly according to claim 15, wherein
   a first mounting hole is provided on each of the bracket support arms, the first mounting hole is sleeved at a joint between the first mounting end portion and the connection portion, a cross-sectional size of the first mounting hole is greater than a cross-sectional size of the joint between the first mounting end portion and the connection portion, and both a cross-sectional size of the first mounting end portion and a cross-sectional size of the connection portion are greater than the cross-sectional size of the first mounting hole and both are greater than the cross-sectional size of the joint between the first mounting end portion and the connection portion; and/or
   a second mounting hole is provided on each of the base support arms, the second mounting hole is sleeved at a joint between the second mounting end portion and the connection portion, a cross-sectional size of the second mounting hole is greater than a cross-sectional size of the joint between the second mounting end portion and the connection portion, and both a cross-sectional size of the second mounting end portion and a cross-sectional size of the connection portion are greater than the cross-sectional size of the second mounting hole and both are greater than the cross-sectional size of the joint between the second mounting end portion and the connection portion.

17. An unmanned aerial vehicle assembly, comprising:
an unmanned aerial vehicle;
a load; and
a shock-absorbing bracket, wherein a mounting bracket of the shock-absorbing bracket is mounted on the unmanned aerial vehicle, and a base of the shock-absorbing bracket carries the load; and the shock-absorbing bracket comprises:
- a mounting bracket;
- a base, wherein the base is spaced apart from the mounting bracket; and
- a plurality of shock-absorbing elements, wherein one end of each of the plurality of shock-absorbing elements is connected with the mounting bracket, and the other end of each of the plurality of shock-absorbing elements is connected with the base, and wherein
  - at least three of the plurality of shock-absorbing elements are first shock-absorbing elements,
  - at least one of the plurality of shock-absorbing elements is a second shock-absorbing element,
  - the at least three first shock-absorbing elements are located at three corners of a triangle, the triangle defining a horizontal plane, and
  - the at least one second shock-absorbing element is located
    - above the horizontal plane and
    - in a location that, when the location is orthographically projected onto the horizontal plane, is on a side of the triangle and midway between two of the corners of the triangle.

18. The unmanned aerial vehicle assembly according to claim 17, wherein
   the plurality of at least three first shock-absorbing elements includes four first shock-absorbing elements; and
   the four first shock-absorbing elements are distributed at four corners of a rectangle;
   a length direction of the rectangle is parallel to a vertical plane, and a width direction of the rectangle is perpendicular to the vertical plane; and
   the rectangle is symmetrical about the vertical plane.

19. The unmanned aerial vehicle assembly according to claim 17, wherein
   the at least one second shock-absorbing elements includes two second shock-absorbing elements,
   the first of the two at least three first shock-absorbing elements and the second of the at least three first shock-absorbing elements are located on different sides of the vertical plane, and
   the two second shock-absorbing elements are symmetrical about the vertical plane.

20. The unmanned aerial vehicle assembly according to claim 17, wherein each of the plurality of shock-absorbing elements has a central axis, and a central axis of each of the first shock-absorbing elements is perpendicular to the horizontal plane; and a central axis of each of the second shock-absorbing elements is perpendicular to the vertical plane;
   each of the plurality of shock-absorbing element comprises a first mounting end portion, a connection portion, and a second mounting end portion; the connection portion is connected with the first mounting end portion and the second mounting end portion, and the first mounting end portion, the connection portion, and the second mounting end portion are sequentially arranged on the central axis of each of the plurality of shock-absorbing elements; and the first mounting end portion is mounted on the mounting bracket, and the second mounting end portion is mounted on the base.

* * * * *